United States Patent [19]

Wraige

[11] Patent Number: 5,077,119

[45] Date of Patent: Dec. 31, 1991

[54] FABRIC CONDITIONING

[75] Inventor: Douglas Wraige, Chester, United Kingdom

[73] Assignee: Lever Brothers Company, Division of Conopco, Inc., New York, N.Y.

[21] Appl. No.: 505,196

[22] Filed: Apr. 5, 1990

[30] Foreign Application Priority Data

Apr. 10, 1989 [GB] United Kingdom ................ 8908009

[51] Int. Cl.[5] ........................ B05D 5/00; B05D 5/12; B32B 3/00; B32B 33/00

[52] U.S. Cl. ...................................... 428/190; 252/90; 252/91; 252/92; 427/242; 428/195; 428/196; 428/224; 428/246; 428/262; 428/265; 428/284; 428/289; 428/308.4

[58] Field of Search ............................ 252/90, 91, 92; 427/242; 428/190, 195, 196, 224, 246, 262, 265, 284, 289, 308.4

[56] References Cited

U.S. PATENT DOCUMENTS

| | | | |
|---|---|---|---|
| 3,676,199 | 10/1970 | Hewitt et al. . | |
| 3,895,128 | 7/1975 | Gaiser . | |
| 4,179,390 | 12/1979 | Spadini et al. | 427/242 |
| 4,229,475 | 10/1980 | Barrett | 427/242 |
| 4,391,725 | 7/1983 | Bossu | 427/242 |
| 4,733,774 | 5/1988 | Ping . | |
| 4,740,326 | 4/1988 | Hartel et al. | 427/242 |
| 4,767,548 | 8/1988 | Kasprzals et al. | 427/242 |
| 4,892,555 | 1/1990 | Leigh et al. | 427/242 |
| 4,931,200 | 6/1990 | Shaulslin | 427/242 |

FOREIGN PATENT DOCUMENTS

| | | |
|---|---|---|
| 220904 | 5/1987 | European Pat. Off. . |
| 2022642 | 12/1979 | United Kingdom . |
| 1587650 | 4/1981 | United Kingdom . |

*Primary Examiner*—James C. Cannon
*Attorney, Agent, or Firm*—A. Kate Huffman

[57] ABSTRACT

A fabric conditioning article is provided comprising a substrate and, applied to the substrate, a fabric-softening material and a bleach agent, wherein the substrate comprises at least two separate areas, the first area comprising softening material and being substantially free of peroxy bleach, and the second area comprising peroxy bleach and being substantially free of softening material.

6 Claims, No Drawings

FABRIC CONDITIONING

The present invention relates to an article suitable for conditioning of fabrics in a tumble dryer, and to a method of conditioning fabrics.

In the treatment of fabrics in for instance a tumble dryer, it is known in the art to add one or more conditioning articles. For instance, for imparting a softening benefit to fabrics, it is known from CA 005 204 (Procter & Gamble) to commingle fabrics in a tumble dryer with a flexible substrate carrying a normally solid fabric conditioning agent.

It has also been suggested in GB 2 022 642 (Colgate) to combine a poly-urethane foam substrate with a liquid fabric conditioning composition comprising a softening and a bleach component in a weight ratio between 5:7 and 5:1. The use of such liquid fabric conditioning compositions, however, has the disadvantage that only relatively low levels of active material can be incorporated in non-woven or other commonly used substrates.

It is an object of the present invention to provide a fabric conditioning article comprising a substrate, a fabric softener and a bleach. It is a second object of the present invention to provide a fabric conditioning article which is highly effective with regard to both softening and bleach performance.

Further objects of the present invention are to provide a fabric conditioning article with increased stability, good release properties and possible high ratios of active materials to substrate.

It has been found that, surprisingly, one or more of the above-mentioned objects can be met in a conditioning article according to the invention, provided that the orientation of the ingredients with respect to each other is carefully chosen.

Therefore, the invention relates to a fabric conditioning article comprising a substrate and, applied to the substrate, a fabric softening material and a bleach agent, wherein the substrate comprises at least two separate areas, the first area comprising softening material and being substantially free of bleach, the second area comprising bleach and being substantially free of softening material.

For the purpose of this specification the wording "substantially free of" or "substantially in the absence of" refers to a situation wherein the minor ingredient is present at a level of at most 10% by weight of the major ingredient, preferably at a level of less than 5%, more preferably less than 1%. Thus the expression "one area comprising softening material and being substantially free of bleach" indicates that the amount of bleach in that area is less than 10% by weight of the softening material.

Surprisingly, it has been found that the performance of a substrate article according to the invention is improved by applying the softener component and the bleach component to separate areas of the substrate. When the two components are applied to the same areas of the substrate a decrease particularly in bleach performance can be observed.

THE SUBSTRATE

The substrate can be made of any material suitable for use in combination with a fabric softener and a bleach material. Examples of suitable substrate materials include non-woven and woven fibrous structures, of natural and synthetic fibres, foams, sponges and films.

The substrate may have any one of a number of physical forms such as rods, tubes, blocks, balls and sheets. Preferably the substrate comprises at least one flexible sheet substrate such as cotton substrates and non-woven substrates such as poly-urethane substrates.

Preferably, the surface of such a flexible sheet substrate is divided into a plurality of separate areas, one or more areas comprising softener material substantially in the absence of bleach, and one or more areas comprising bleach substantially in the absence of softener material. The sheet substrate will comprise at least two separate areas, but for reasons of, for instance, convenience or appearance, more than two areas may be present if desired.

Alternatively, the substrate may comprise two or more flexible sheet substrates which are attached to each other. Each of the sheets may then still be divided into a plurality of separate areas, as described hereinabove, but alternatively each sheet may comprise either the softener substantially in the absence of bleach or the bleach component substantially in the absence of softener, provided that both the softener and the bleach are present in the conditioning article.

THE FABRIC-SOFTENING MATERIAL

The fabric-softening material for use in an article according to the present invention can be any material suitable for the softening of fabrics. Usually these materials will be non-anionic. Especially preferred are cationic and nonionic materials or mixtures thereof.

When the fabric-softener material is a cationic material this material is preferably water-insoluble in that it has a solubility in water at pH 2.5 and 20° C. of less than 10 g/l. Highly preferred materials are cationic quaternary ammonium salts having two $C_{12-24}$ hydrocarbyl chains.

Well-known species of substantially water-insoluble quaternary ammonium compounds have the formula:

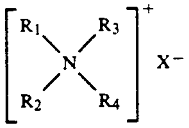

wherein $R_1$ and $R_2$ represent hydrocarbyl groups containing from about 12 to about 24 carbon atoms; $R_3$ and $R_4$ represent hydrocarbyl groups containing from 1 to about 4 carbon atoms; and X is an anion, preferably selected from halide, methyl sulphate and ethyl sulphate radicals.

Representative examples of these quaternary softeners include ditallow dimethyl ammonium chloride; ditallow dimethyl ammonium methyl sulphate; dihexadecyl dimethyl ammonium chloride; di(hydrogenated tallow) dimethyl ammonium methyl sulphate; dihexadecyl diethyl ammonium chloride; di(coconut) dimethyl ammonium chloride. Ditallow dimethyl ammonium chloride, di(hydrogenated tallow) dimethyl ammonium chloride, di(coconut) dimethyl ammonium chloride and di(coconut) dimethyl ammonium methosulphate are preferred.

Suitable materials also include dialkyl ethoxyl methyl ammonium methosulphate based on soft fatty acid, dialkyl ethoxyl methyl ammonium methosulphate based on hard fatty acid, and a material in which $R_3$ and $R_4$ represent methyl, $R_1$ is $C_{13-15}$, $R_2$ is $CH_2CH_2OCOR$, where R is stearyl, and X is methosulphate. Materials in which $R_2$, $R_3$ and $R_4$ each represent methyl, $R_1$ is the group

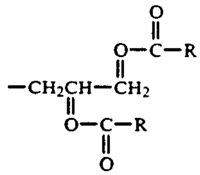

where R is hardened tallow and X is methosulphate or $R_2$ is methyl, are also suitable Ditallow dimethyl ammonium chloride, di(hydrogenated tallow alkyl) dimethyl ammonium chloride, di(coconut alkyl) dimethyl ammonium chloride and di(coconut alkyl) dimethyl ammonium methosulphate are preferred.

Other preferred cationic compounds include those materials as disclosed in EP 239,910 (P&G), which is included herein by reference.

In this specification the expression "hydrocarbyl group" refers to alkyl or alkenyl groups optionally substituted or interrupted by functional groups such as —OH, —O—, —CONH, —COO—, etc.

Other preferred materials are the materials of formula:

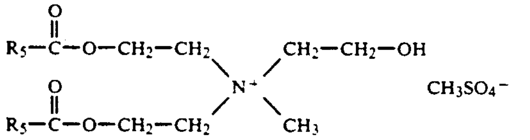

$R_5$ being partially hardened tallow, which is available from Stepan under the tradename Stepantex VRH 90, and

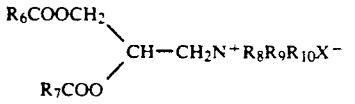

Where $R_8$, $R_9$ and $R_{10}$ are each alkyl or hydroxyalkyl groups containing from 1 to 4 carbon atoms, or a benzyl group, $R_6$ and $R_7$ are each an alkyl or alkenyl chain containing from 11 to 23 carbon atoms, and $X^-$ is a water soluble anion, substantially free of the corresponding monoester.

Another class of preferred water-insoluble cationic materials are the hydrocarbyl imidazolinium salts believed to have the formula:

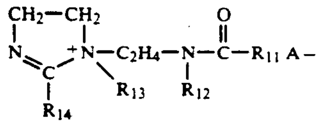

wherein $R_{13}$ is a hydrocarbyl group containing from 1 to 4, preferably 1 or 2 carbon atoms, $R_{11}$ is a hydrocarbyl group containing from 8 to 25 carbon atoms, $R_{14}$ is an hydrocarbyl group containing from 8 to 25 carbon atoms and $R_{12}$ is hydrogen or a hydrocarbyl containing from 1 to 4 carbon atoms and $A^-$ is an anion, preferably a halide, methosulphate or ethosulphate.

Preferred imidazolinium salts include 1-methyl-1-(tallowylamido-) ethyl -2-tallowyl- 4,5-dihydro imidazolinium methosulphate and 1-methyl-1-(palmitoylamido)ethyl -2-octadecyl-4,5- dihydroimidazolinium chloride. Other useful imidazolinium materials are 2-heptadecyl-1-methyl-1- (2-stearylamido)ethyl-imidazolinium chloride and 2-lauryl-1-hydroxyethyl-1-oleyl-imidazolinium chloride. Also suitable herein are the imidazolinium fabric-softening components of U.S. Pat. No. 4,127,489, incorporated by reference.

Representative commercially available materials of the above classes are the quaternary ammonium compounds Arquad 2HT (ex AKZO); Noramium M2SH (ex CEKA); Aliquat-2HT (Trade Mark of General Mills Inc), Stepantex Q185 (ex Stepan); Stepantex VP85 (ex Stepan); Stepantex VRH90 (ex Stepan); Synprolam FS (ex ICI) and the imidazolinium compounds Varisoft 475 (Trade Mark of Sherex Company, Columbus, Ohio) and Rewoquat W7500 (Trade Mark of REWO).

The fabric-softening material for use in an article according to the present invention may comprise optionally in addition to one or more cationic fabric softening agents, one or more amines.

The term "amine" as used herein can refer to (i) amines of formula

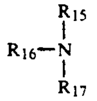

(I)

wherein $R_{15}$, $R_{16}$ and $R_{17}$ are as defined below;

(ii) amines of formula

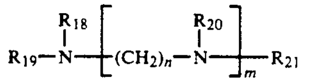

(II)

wherein $R_{18}$, $R_{19}$, $R_{20}$ and $R_{21}$, m and n are as defined below.

(iii) imidazolines of formula

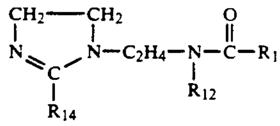

(III)

wherein $R_{11}$, $R_{12}$ and $R_{14}$ are as defined above.

(iv) condensation products formed from the reaction of fatty acids with a polyamine selected from the group consisting of hydroxy alkylalkylenediamines and dialkylenetriamines and mixtures thereof. Suitable materials are disclosed in European Patent Application 199 382 (Procter & Gamble), incorporated herein by reference.

When the amine is of the formula I above, $R_{15}$ is a $C_6$ to $C_{24}$, hydrocarbyl group, $R_{16}$ is a $C_1$ to $C_{24}$ hydrocarbyl group and $R_{17}$ is a $C_1$ to $C_{10}$ hydrocarbyl group. Suitable amines include those materials from which the quaternary ammonium compounds disclosed above are derived, in which $R_{15}$ is $R_1$, $R_{16}$ is $R_2$ and $R_{17}$ is $R_3$. Preferably, the amine is such that both $R_{15}$ and $R_{16}$ are $C_6$–$C_{20}$ alkyl with $C_{16}$–$C_{18}$ being most preferred and with $R_{17}$ as $C_{1-3}$ alkyl, or $R_{15}$ is an alkyl or alkenyl group with at least 22 carbon atoms and $R_{16}$ and $R_{12}$ are $C_{1-3}$ alkyl. Preferably these amines are protonated with hydrochloric acid, orthophosphoric acid (OPA), $C_{1-5}$ carboxylic acids or any other similar acids, for use in the fabric conditioning compositions of the invention.

When the amine is of formula II above, $R_{18}$ is a $C_6$ to $C_{24}$ hydrocarbyl group, $R_{19}$ is an alkoxylated group of formula $—(CH_2CH_2O)_yH$, where y is within the range from 0 to 6, $R_{20}$ is an alkoxylated group of formula $—(CH_2CH_2O)_zH$ where z is within the range from 0 to 6 and m is an integer within the range from 0 to 6, and is preferably 3. When m is 0, it is preferred that $R_{18}$ is a $C_{16}$ to $C_{22}$ alkyl and that the sum total of z and y is within the range from 1 to 6, more preferably 1 to 3. When m is 1, it is preferred that $R_{18}$ is a $C_{16}$ to $C_{22}$ alkyl and that the sum total of x and y and z is within the range from 3 to 10.

Representative commercially available materials of this class include Ethomeen (ex Armour) and Ethoduomeen (ex Armour).

Preferably the amines of type (ii) or (iii) are also protonated for use in the fabric conditioning compositions of the invention.

When the amine is of type (iv) given above, a particularly preferred material is

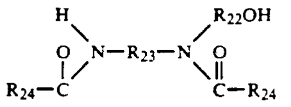

where $R_{22}$ and $R_{23}$ are divalent alkenyl chains having from 1 to 3 carbons atoms, and $R_{24}$ is an acyclic aliphatic hydrocarbon chain having from 15 to 21 carbon atoms. A commercially available material of this class is Ceranine $HC_{39}$ (ex Sandoz).

The fabric-softening material for use in an article according to the invention may also include a fabric-substantive amphoteric material. Suitable amphoteric materials form a particulate dispersion at a concentration of less than 1 g/l at least one temperature between 0° and 100° C. For the purpose of this invention a fabric-substantive amphoteric material is preferably an amphoteric or zwitterionic tertiary or quaternary ammonium compound having either one single very long hydrocarbyl side chain or two long hydrocarbyl chains. From these compounds the use of amphoteric or zwitterionic ammonium compounds having two long hydrocarbyl chains is particularly preferred for many reasons including cost, ease of processing and better stability and performance.

Amphoteric or zwitterionic ammonium compounds preferably have two long hydrocarbyl chains, each chain having 8-24 carbon atoms, preferably 10-20 carbon atoms, most preferably around 16 carbon atoms.

Suitable amphoteric fabric-substantive materials for use in a fabric-treatment composition according to the invention are for instance:

I) Ampholytes of the following formula:

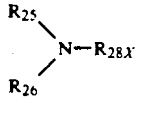

II) Hydrocarbyl betaines of the following formula:

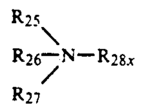

III) Hydrocarbylamido betaines of the following formula:

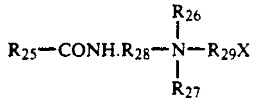

IV) Glycinates or propionates of the following formula:

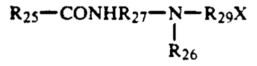

or

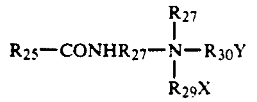

V) Tertiary amine oxides of the following formula

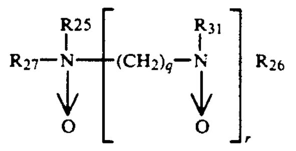

wherein:

a) $R_{25}$ and $R_{26}$ are $C_{8-25}$ hydrocarbyl chains, $R_{27}$ is a hydrocarbyl group containing 1-4 carbon atoms or a group $—(CH_2.CH_2O)_nH$, $R_{28}$, $R_{29}$, $R_{30}$ are $—(CH_2)—$, which can be interrupted with —O—, —CONH—,—COO— etc, $R_{31}$ is $R_{27}$, r is 0 or 1, n is an integer from 1-6, X, Y are $SO_3$, $SO_4^{2-}$ or $COO^-$ or b) $R_{25}$ is a $C_{12-50}$ hydrocarbyl chain, $R_{26}$, $R_{27}$ are hydrocarbyl groups containing 1-4 carbon atoms or a group $—(CH_2CH_2O)_nH—$, $R_{28}$, $R_{29}$, $R_{30}$ are $—(CH_2)_n—$ which can be interrupted by —O—, —COHN—, —COO— etc, $R_{31}$ is $R_{27}$, r is 0 or 1, n is an integer from 1-6, X, Y are $SO_3$, $SO_4^{2-}$ or $COO^-$.

Preferably the amphoteric fabric-substantive materials are water-insoluble and have a solubility in water at pH 2.5° at 20° C. of less than 10 g/l. The HLB of the amphoteric fabric-substantive material is preferably less than 10.0.

Examples of amphoteric materials of the above groups and their method of preparation are given in our co-pending European patent application 89200113.2.

From the above-listed materials, particularly the group V materials are preferred, especially those amine oxides containing two hydrocarbyl groups with at least 14 carbon atoms, such as dihardened tallow methyl amine oxide, or one hydrocarbyl group with at least 22 carbon atoms. Amine oxides have been found to provide particularly advantageous softening effects.

The fabric-softener materials may also comprise, optionally in addition to the cationic fabric-softening agent, other non-cationic fabric-softening agents, such as nonionic fabric-softening agents. Suitable nonionic fabric-softening agents include glycerol esters, such as glycerol mono-stearate, fatty alcohols, such as stearyl alcohol, alkoxylated fatty alcohols, $C_9$–$C_{24}$ fatty acids and lanolin and derivatives thereof. Suitable materials are disclosed in European Patent Application 88 520 (Unilever PLC/NV Case C 1325), 122 141 (Unilever PLC/NV Case C 1363) and 79 746 (Procter & Gamble), the disclosures of which are incorporated herein by reference.

THE BLEACH

The bleach material for use in a fabric conditioning article according to the present invention can be any chemical compound providing bleach activity under laundry dryer conditions, examples of suitable bleaches are chlorine bleaches, peracid bleaches, reducing bleaches and peroxy bleaches. Preferably peroxy bleach compounds are used.

Examples of suitable peroxygen compounds include hydrogen peroxide, the perborates, persulphates, peroxy disulphates, perphosphates and the crystalline peroxyhydrates formed by reacting hydrogen peroxide with urea or alkali metal carbonate. The peroxy bleach is preferably solid and water soluble.

Most preferred is the use of a perborate material as the peroxy bleach component.

THE SUBSTRATE, SOFTENER, PEROXY BLEACH COMBINATION

The softener and the peroxy bleach material may be applied to the substrate by any method suitable for the application of materials to a substrate. For example, the softener material may be applied to the substrate in melted form, in solubilised form followed by evaporation of the solvent and in solid form. The bleach material may for instance be applied to the substrate in solid form, in liquid form or in solubilised form, followed by the evaporation of the solvent. For ensuring that both materials are applied to separate areas of the substrate any conventional shielding means can be used. Also possible is the preparation of two or more separate substrates, one of these comprising bleach but being substantially free of softener, a second comprising softening material substantially free of bleach, followed by the attaching of the substrates to one another to obtain the fabric conditioning article according to the present invention.

Preferably the amount of softener plus bleach on the substrate will be sufficient to obtain a certain softening and bleach effect when treating fabrics during the tumble dryer stage with an article according to the invention. Also possible is that articles are designed to provide the above-mentioned effects during more than one tumble dryer cycles. It will be apparent that such multi-use articles generally will comprise higher levels of active ingredients than single-use articles.

For single-use products the dry weight of softening material plus bleach material on the substrate is preferably from 0.5 to 50 g per article, more preferably from 1 to 15 g , most preferably from 1 to 7.5, typically from 1.5 to 4 g. For these articles the add-on ratio (the weight ratio of active materials to substrate) is preferably from 50:1 to 1:5, more preferably from 10:1 to 1:1.

The dry weight ratio of softener material to bleach material will preferably be between 50:1 and 1:50, more preferably from 25:1 to 1:25, most preferably from 10:1 to 1:10.

OPTIONAL INGREDIENTS

Fabric conditioning articles according to the present invention may comprise one or more optional ingredients, which may be present in the softener areas and/or the bleach areas and/or in separate areas of the substrate. The choice of optimum location of the optional ingredients is determined by practical considerations. For instance, an ingredient which is not stable in the presence of the peroxy bleach material will generally be included in the areas of the substrate which are substantially free of bleach. Examples of optional ingredients are non-aqueous solvents such as $C_1$–$C_4$ alkanols and polyhydric alcohols, pH buffering agents such as strong or weak acids e.g. HCl, $H_2SO_4$, phosphoric, benzoic or citric acids, rewetting agents, electrolytes, for example calcium chloride, anti-gelling agents, perfumes, perfume carriers, fluorescers, colourants, hydrotropes, anti-foaming agents, anti-redeposition agents, enzymes, optical brightening agents, opacifiers, stabilisers such as guar gum and polyethylene glycol, emulsifiers, anti-shrinking agents, anti-wrinkle agents, fabric crisping agents, anti-spotting agents, soil-release agents, germicides, linear or branched silicones, fungicides, anti-oxidants, anti-corrosion agents, preservatives such as Bronopol (Trade Mark), a commercially available form of 2-bromo-2-nitropropane-1,3-diol, dyes, drape imparting agents, antistatic agents and ironing aids.

Fabric conditioning articles according to the present invention are especially suitable for the conditioning of fabrics in a tumble dryer. A preferred method for conditioning fabrics therefore involves the treating of fabrics in a tumble dryer in the presence of a fabric conditioning article according to the present invention. Generally, such a method will involve the treatment of wet fabrics following a wash cycle in an ordinary washing machine. Surprisingly, however, it has also been discovered that the advantageous bleaching can also be observed when treating dry fabrics with a conditioning article of the present invention.

The invention will be further illustrated by means of the following examples:

EXAMPLE I

Pieces of polyester non-woven sheet substrate (density 23 g/m$^3$) of 28×23 cm were divided into two areas of 13×23 cm, said areas being separated by a corridor area of 2×23 cm. One of the areas was coated with 2 g of a fabric-softener material containing 20% Arosurf TA 100 ( Dihardened Tallow dimethyl ammonium chloride) and 80% Crodurette 10 ET ( alkoxylated alcohol with 10 EO groups) which was applied solubilised in chloroform, followed by evaporation of the solvent. The other area was coated with 2 g of sodium perborate monohydrate which was applied by sprinkling, in granular form to the substrate, which had been moistened, followed by drying.

For comparison, an identical piece of substrate was coated with the same amounts of active ingredients which were applied by first applying the chloroform-/softener mixture to the entire surface of the substrate, evaporating the chloroform and sprinkling the bleach on the entire surface of the product.

A 2.5 kg wash load consisting of polyester/cotton, cotton and polyester sheetings plus cotton pieces comprising BCl, wine, raspberry or blackberry stains were dried throughout in a Creda Debonair Reversair tumble dryer with a drying cycling time of 50 minutes in the presence of one of the above conditioning articles.

The bleaching performance was measured by measuring the difference in reflectance at 460 nm between a piece of cotton dried in the absence and in the presence of a conditioning article. A higher value of $\Delta R_{460}$ indicates a better bleaching performance.

The fabrics were treated as described above for three subsequent wash and dry cycles.

The following results were obtained.

| | $\Delta R_{460}$* | |
|---|---|---|
| | Perborate + softener as separate entities | Perborate + softener as a co-mix |
| | average value over three drying cycles | |
| BCl | 1.1 | −0.2 |
| Wine | 6.4 | 2.0 |
| Raspberry | 1.7 | 0.6 |
| Blackberry | 4.8 | 0.0 |

These results clearly illustrate that the application of the softener material and the bleach material to separate areas of the substrate surprisingly enhances the bleach performance.

I claim:

1. A fabric conditioning article comprising a substrate and, applied to the substrate, a fabric-softening material and a bleach agent, wherein the substrate comprises at least two separate areas, the first area comprising softening material and being substantially free of bleach, and the second area comprising bleach and being substantially free of softening material.

2. A fabric conditioning article according to claim 1, wherein the substrate comprises at least one flexible sheet substrate.

3. A fabric conditioning article according to claim 1 wherein the fabric softening material comprises a cationic fabric softening material having a solubility in water at pH 2.5° and 20° C. of less than 10 g/l.

4. A fabric conditioning article according to claim 1 wherein the bleach is a peroxy bleach.

5. A fabric conditioning article according to claim 4, wherein the peroxy bleach comprises a perborate material.

6. Method of conditioning fabrics, comprising the step of treating fabrics in a tumble dryer in the presence of a fabric conditioning article of claim 1.

* * * * *